Patented Nov. 10, 1942

2,301,779

UNITED STATES PATENT OFFICE 2,301,779

RECOVERING HYDROGEN CHLORIDE AND SULPHUR DIOXIDE FROM GAS MIXTURES

Paul Herold and Georg Markus, Leuna, Germany; vested in the Alien Property Custodian No Drawing. Application November 19, 1940, Serial No. 366,260. In Germany November 22, 1939

3 Claims. (Cl. 23—154)

The present invention relates to a method of recovering hydrogen chloride and sulphur dioxide separately from gas mixtures.

In performing chemical reactions one is sometimes faced with the problem of recovering hydrogen chloride and sulphur dioxide separately from gas mixtures. For example, by the interaction of sulphur dioxide and chlorine with hydrocarbons or halogenated hydrocarbons gas mixtures are obtained which contain a large amount of hydrogen chloride along with little sulphur dioxide. In practice these latter constituents are desired to be so separated from the said gas mixtures as to obtain the hydrogen chloride in a dry state free from sulphur dioxide, and the sulphur dioxide, on the other hand, in a concentrated state suitable to be returned to the said interaction. According to a known process the gas mixture containing hydrogen chloride and sulphur dioxide is passed through a container filled with rock salt, which retains the sulphur dioxide, while the hydrogen chloride passes through. In this process, however, the sulphur dioxide is not recovered in an unaltered form. Besides, the process is to be carried out at elevated temperatures and in the presence of oxygen and, moreover, it requires a continuous expenditure of chemicals.

A separation into hydrogen chloride and sulphur dioxide may be effected by washing the gas mixture with sulphuric acid of 88 to 96 p. c. strength. This method offers the special advantage that pure sulphur dioxide which is free from hydrogen chloride is obtained besides pure and dry hydrogen chloride. In cases, however, where the sulphur dioxide need not be free from hydrogen chloride, but where dry hydrogen chloride free from sulphur dioxide and, besides, concentrated sulphur dioxide are wanted, it appears desirable to use washing liquids which are capable of absorbing more sulphur dioxide than concentrated sulphuric acid and, in addition, absorb but slight amounts of hydrogen chloride.

We have now found that liquid or low-melting aromatic compounds containing oxygen in an ethereal or phenolic linkage, have the said desired properties. These liquids allow of stripping a certain amount of gas practically completely of sulphur dioxide with far less an expenditure in equipment and power than sulphuric acid would require inasmuch as the achievement of an equal washing effect requires a smaller quantity of the washing liquids according to our present invention than of sulphuric acid. On the other hand, using both media in equal quantities results in a larger amount of a gas mixture being scrubbed in the case of the washing liquids according to our invention than in the case of sulphuric acid. Difficulties such as arise out of the corrosive properties of sulphuric acid are no longer encountered when proceeding in accordance with the new method. The washing liquids in accordance with the present invention allow of constructing the equipment in a simplified form with the use of materials of lesser resistance to corrosion, and hence of cutting down the cost of the plant.

As suitable washing liquids we may mention, for example, diphenyl ether and xylenol. Whereas 1 liter of sulphuric acid of 96 per cent strength, from a gas mixture of 90 per cent by volume of hydrogen chloride and 10 per cent by volume of sulphur dioxide, absorbs 4.5 liters of sulphur dioxide, 1 liter of diphenyl ether will absorb 9.5 liters and 1 liter of xylenol will absorb 13 liters of sulphur dioxide. Among other suitable washing liquids we may mention anisol, phenetol and commercial cresol.

The hydrogen chloride leaves the washing liquid in a dry state free from sulphur dioxide. The gas mixture to be worked up may either be passed through the liquid while this is stationary, or be led in counter-current to the liquid flowing down, preferably in trickling towers charged with filler bodies.

The washing liquid may easily be regenerated by expelling the gas absorbed by heating or the application of reduced pressure or by subjecting it to both measures simultaneously. The washing liquid may then be used again, if desired after cooling.

It is to be recommended that the gas mixture to be separated should be supplied to the washing liquid in not too wet a condition, since larger quantities of moisture unfavorably tend to absorb too large a quantity of hydrogen chloride.

Depending on the composition of the gas mixture to be separated and on the washing liquid to be used, the operation may be carried out at an ordinary or a lower temperature and, if desired, also under increased pressure.

The following examples serve to illustrate how the present invention may be carried out in practice but the invention is not restricted to these examples.

*Example 1*

A gas mixture of 90 per cent by volume of hydrogen chloride and 10 per cent by volume of sulphur dioxide, which results in the treatment of a hydrocarbon oil with sulphur dioxide and chlorine, is passed in an upward direction, at ordinary temperature, through a washing tower charged with filler bodies and being under atmospheric pressure. This washing tower is trickled over with technical xylenol. The amount of xylenol passed through is 1 part by volume to 115 parts by volume of the gas mixture. The hydrogen chloride leaving the tower is dry and free from sulphur dioxide. The xylenol leaving the tower which is laden with sulphur dioxide is heated to 70° C. in a second tower, by which treatment the sulphur dioxide absorbed is completely led off in a concentrated state. The xylenol is returned to the first tower after cooling.

Example 2

A gas having the same composition as that of Example 1 is passed through a washing tower charged with filler bodies, in which technical diphenyl ether is caused to trickle down. To achieve the same effect as in the first example, 1 part by volume of diphenyl ether is needed for 95 parts by volume of the gas mixture. From the tower there escapes pure dry hydrogen chloride. The gas-laden diphenyl ether issuing from the tower is heated to 55° C. in a second tower under reduced pressure so that the sulphur dioxide is expelled in concentrated form. After cooling, the diphenyl ether is again ready for use.

What we claim is:

1. A process of recovering hydrogen chloride and sulphur dioxide separately from gas mixtures containing both, which comprises washing the gas mixture with a medium liquid under the working conditions and selected from the group which consists of aromatic compounds containing oxygen in an ethereal linkage and of aromatic compounds containing oxygen in a phenolic linkage, and expelling the absorbed sulphur dioxide from the washing liquid.

2. In the process as claimed in claim 1 employing xylenol as washing liquid.

3. In the process as claimed in claim 1 employing diphenyl ether as washing liquid.

PAUL HEROLD.
GEORG MARKUS